Patented Oct. 11, 1949

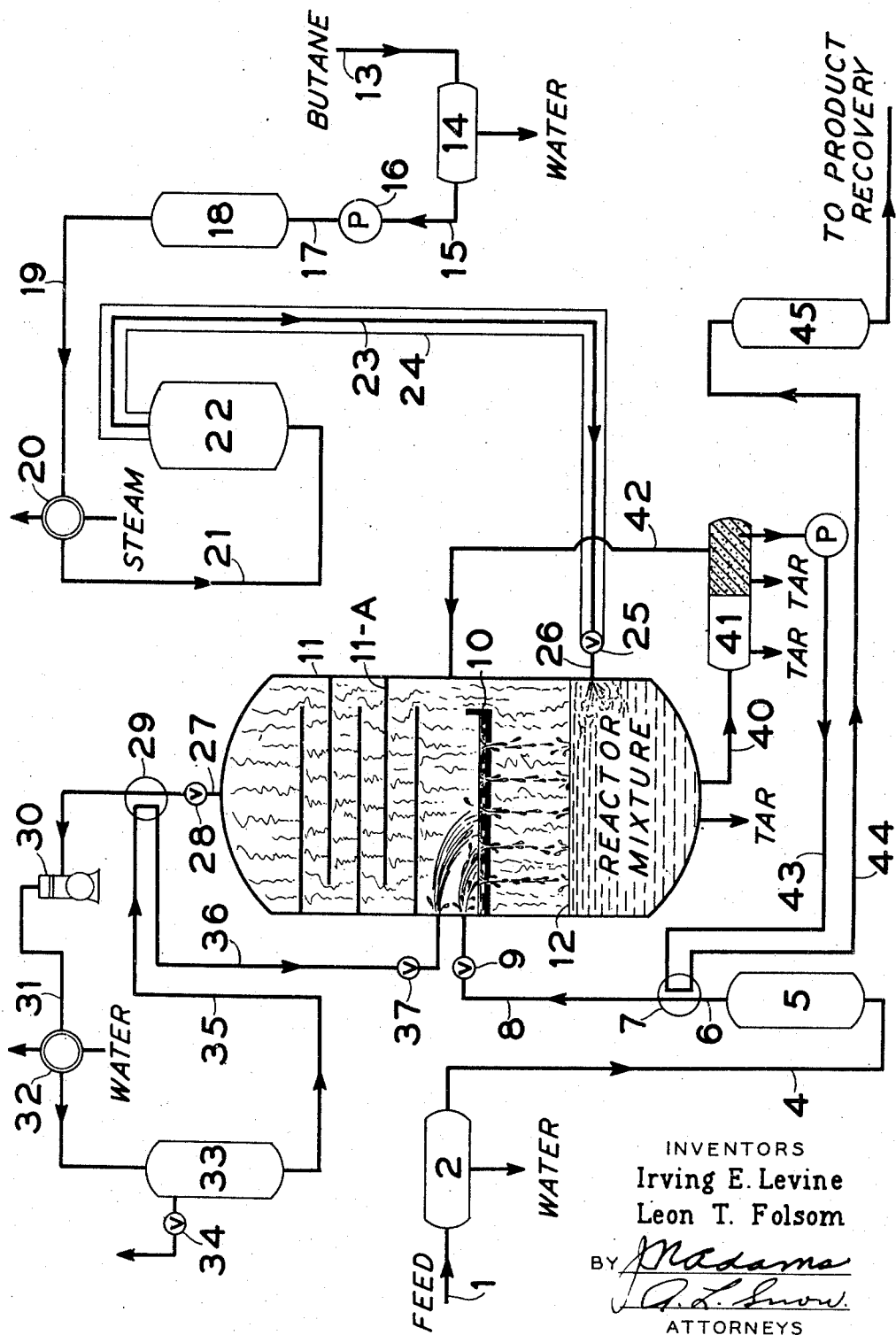

2,484,384

UNITED STATES PATENT OFFICE 2,484,384

POLYMERIZATION PROCESS

Irving E. Levine and Leon T. Folsom, Berkeley, Calif., assignors to California Research Corporation, San Francisco, Calif., a corporation of Delaware Application February 11, 1946, Serial No. 646,732

14 Claims. (Cl. 260—683.15)

1

This invention relates to catalytic conversion of normally gaseous olefins to high molecular weight hydrocarbon polymers and, more particularly, to an improved process of hydrocarbon polymerization.

In carrying out the preferred process of this invention, a normally gaseous polymerizable olefin of more than two carbon atoms is polymerized in a liquid-phase, normally gaseous, inert hydrocarbon solvent. The polymerization is effected in a closed reactor having a vapor-phase section containing hydrocarbon vapors including vapors of said inert hydrocarbon solvent, and a liquid-phase section containing the liquid solution of the polymerizable olefin dissolved in said solvent. The temperature of the reaction is controlled by the pressure in the reactor and the boiling temperature of the reaction mixture at the equilibrium pressure. Accordingly, the solution in the liquid-phase section of the reactor desirably should have a boiling temperature below 150° F., and preferably from 120° F. to —30° F. at the equilibrium pressure in the reactor. When plastic type polymers are desired, the liquid-phase solution may boil at a temperature as low as —80° F. to —100° F. and even lower.

In various instances it may be found desirable to provide a suitable inert diluent for the olefin, which would not vaporize during the polymerization, but which is sufficiently volatile to be readily removed from the final product. Saturated $C_5$ to $C_8$ hydrocarbons are suitable diluents.

Catalysis of the polymerization is effected with a normally solid, acid-reacting catalyst, such as aluminum chloride or other similar Friedel-Crafts type polymerization catalyst. In order to avoid contamination of the vapor-phase section in the reactor with catalyst, and to insure adequate dispersion and intimate contact with the liquid-phase reactants, the preferred aluminum chloride catalyst is dissolved in an inert aliphatic hydrocarbon, such as a butane solvent, and continuously introduced into the reaction mixture below the surface thereof.

In continuous operation the liquid-phase solution of the polymerizable olefin is normally fed to the polymerization system at a temperature at least 30° F., but not more than 180° F. above that of the liquid solution in the liquid-phase section of the reactor. Adiabatic vaporization of the solvent and/or part of the olefin in the feed removes the sensible heat thereof and automatically brings the feed to equilibrium conditions existing in the reactor. For the best operation of the process, it is important to effect the adiabatic

2 vaporization and the resulting self-refrigeration prior to direct contact of the feed with the polymerizing mixture in the reactor in order to avoid excess vapor traffic in the mixture and to prevent or minimize excessive foaming thereof.

Exothermic heat of polymerization is produced upon contacting the cooled liquid feed with the catalyst in the polymerization mixture, and this heat is removed by continuous vaporization of a portion of solvent and/or a portion of the unpolymerized olefin therefrom. Substantially the same equilibrium pressure is maintained on each of the foregoing vaporizations by combining the vapors thereof in the vapor-phase section of the reactor and discharging the combined vapors at the equilibrium pressure in said reactor. These combined vapors may then be cooled and condensed to form condensate. Preferably, this liquid-phase condensate is continuously recirculated to the reactor.

It has been found advantageous to cool and condense the combined vapors from the reactor at a temperature substantially above the temperature of polymerization. When this feature is utilized, it is likewise important to allow the recirculated solvent to reach reactor equilibrium conditions by adiabatic vaporization prior to mixing with the polymerizing reactants. Preferably, the vapors from this last self-refrigeration are admitted directly to the vapor-phase section of the reactor in order that the amount of refrigeration will be automatically and directly controlled to yield reactor equilibrium temperatures. Again, excess vapor traffic and foaming are prevented by releasing the vapors from the recirculated solvent prior to introduction of the solvent into the reaction mixture.

Feeds to be used in the process of this invention include normally gaseous olefins, such as propylene, the normal butenes, isobutene or mixtures thereof. The olefin preferably is dissolved in a normally gaseous inert hydrocarbon. Suitable hydrocarbon solvents are: liquid methane, ethane, propane, butane or mixtures thereof. Various olefin-containing gases, for example, olefin gases from thermal or catalytic cracking of petroleum crude, as well as residual olefin gases from alkylation of hydrocarbons and other processes may be used.

The olefin feed, together with its normally gaseous hydrocarbon solvent, should be freed from moisture, because otherwise an eventual hydrolysis of the catalyst, particularly of aluminum chloride, is apt to take place, resulting in an increased catalyst consumption, enhanced risk of corrosion to the process equipment, and decreased yields of the product. Moisture present in the feed may be removed in any suitable manner, as by passing the liquid feed through alumina-packed driers. Similarly, the inert hydrocarbon solvent for the catalyst should have moisture removed therefrom, as by contacting with an alumina drier.

Various types of equipment may be used in carrying out the process of this invention, and for the sake of illustration, suitable apparatus for effecting polymerization in a continuous manner will be described.

The accompanying drawing is a flow sheet showing suitable process equipment in a semi-diagrammatic manner.

Referring to the drawing, a suitable olefin feed, such as a mixture of propylene and propane or of butenes and butane, is introduced through line 1 into a settling tank 2 where free water is removed by gravity separation. After leaving the settling tank, the feed passes through line 4 to an alumina drier 5 where residual moisture is adsorbed to yield a substantially moisture-free stock, for example, containing not more than about 0.002% by weight of water. For convenience in operation, two or more alumina-packed driers may be utilized in order that they may be operated and regenerated alternately. Outlet conduit 6 from drier 5 conveys the dried feed through precooler 7 and line 8 to throttle valve 9. The pressure in line 8 and the temperature of the feed stock at this point are substantially above the equilibrium pressure and temperature in reactor 11. In a typical operation, the feed stock in line 8 behind throttle valve 9 will be at a pressure of about 250 pounds per square inch gauge and about 60° F., whereas the temperature in reactor 11 will be about 30° F. for a correspondingly lower equilibrium pressure.

Pressure is released in throttle valve 9 and the feed stock immediately passes into reactor 11 upon a perforated plate 10 located substantially above the liquid level 12 of the reaction mixture. Perforated plate 10 serves to support the liquid feed and to allow removal of the sensible heat of the feed by adiabatic vaporization prior to introduction in the reaction mixture. Since the pressure on the liquid feed at this point is the equilibrium pressure in the reactor, the adiabatic vaporization automatically brings the feed to equilibrium conditions. By effecting this self-refrigeration above the liquid level 12 of the reaction mixture, foaming is substantially reduced, and more efficient results are obtained. The tendency of the feed to foam is substantially less than that of the reaction mixture, by reason of the fact that the reaction mixture contains catalyst and high molecular weight polymers which increase the viscosity of the solution and the relative foam stability.

The self-refrigerated feed flows through the perforations of plate 10 into the liquid-phase section of reactor 11 and is then intimately contacted with catalyst in the polymerizing mixture. Upon contact with the catalyst in this mixture, the olefins in the feed are converted to high molecular weigh polymers and release exothermic heat of reaction. The temperature of the reaction mixture is controlled and the exothermic heat is removed by vaporization of the more volatile hydrocarbons in said mixture. Polymerization thus occurs at the boiling point of the mixture, which is determined by the equilibrium pressure on reactor 11. Local overheating is avoided in the reaction mixture, since, whenever the temperature in any region thereof reaches the boiling point, vaporization immediately occurs, and vapors thus formed absorb the heat without the necessity of indirect refrigeration from an external source.

Polymer solution is continuously withdrawn from the bottom of reactor 11 by line 40, and catalyst sludge or tar is removed in settler 41 which may be partially rock-packed as indicated. Further polymerization of unreacted olefins occurs in the settler. Any vapors which may be formed in the settler are returned through pressure-equalizing line 42 into the vapor-phase section of reactor 11, where they join other vapors before ascending through entrainment separators. Polymer solution separated from entrained tar is pumped from settler 41 through line 43 to precooler 7 where the temperature of the olefin feed is reduced by heat exchange as previously indicated. Conduit 44 conveys the polymer solution from precooler 7 to filters 45 where residual catalyst is removed by contact with adsorbent clay or other suitable adsorbent. The treated polymer solution then passes to product recovery where solvent is removed by any suitable procedure, such as a multi-stage distillation utilizing high vacuum in the final distillation stage.

Reference has been made to catalysis of the olefin polymerization with an acid-reacting Friedel-Crafts type catalyst such as aluminum chloride. It has been found that a uniform and continuous flow of catalyst to the reactor can be obtained, simultaneously with accurate control of catalyst concentration, and avoidance of catalyst poisoning from tars, by forming a liquid solution of aluminum chloride in butane or other suitable inert aliphatic hydrocarbon solvent. It is important that the butane solvent be substantially free from olefins and/or $C_5$ and higher paraffin hydrocarbons. Should the solvent contain more than approximately 0.01 mol per cent of olefins and/or 0.1 mol per cent of pentanes and higher paraffin hydrocarbons, an undue formation of tar is likely to render the dissolution of $AlCl_3$ in butane extremely difficult if not impossible.

This solution of $AlCl_3$ in liquid butane preferably is obtained, as shown in the drawing, by passing butane from inlet line 13 through a water separator 14, line 15, pump 16, and then line 17 to an alumina drier 18. Residual water in the liquid-phase butane is adsorbed by the alumina drier and the water content preferably reduced to at least 0.002% by weight. The dried liquid-phase butane then flows by way of line 9 to heater 20 where the temperature of the butane is raised to at least about 165° F., sufficient pressure being maintained on the system to keep the butane in liquid phase. The hot liquid-phase butane then flows through conduit 21 to aluminum chloride saturator 22. In a continuous plant it will be found advantageous to provide at least two aluminum chloride saturators as well as two alumina driers, in order that one drier or one saturator may be replenished while the other is in operation. The hot, liquid butane dissolves aluminum chloride in saturator 22 to form the liquid catalyst solution which then passes through line 23 jacketed with a hot-water pipe 24, to throttle valve 25. The hot-water pipe jacket 24 is provided to prevent the precipitation of aluminum chloride from the catalyst solution in the course of its journey through line 23 to the reactor. Valve 25 is provided with a short, narrow catalyst-feed pipe 26 for introducing the liquid aluminum chloride-saturated butane stream into reactor 11 below the liquid level of the reaction mixture. If desired, a set of capillary tubes may be provided to feed the catalyst into the reactor and to prevent release of pressure on the hot butane solution prior to actual release of the catalyst solution into the liquid-phase reaction mixture. However, it has been found feasible to use small tubes substantially greater than capillary size, e. g., ⅝ inch inside diameter.

The catalyst is quickly dispersed throughout the reaction mixture and almost immediately reduced to reaction temperature by vaporization of the catalyst solvent upon release of pressure and by the self-refrigerating action of the large bulk of liquid but highly volatile hydrocarbons in the liquid-phase section of the reactor. Introduction of the catalyst below the liquid level in the reactor prevents contamination of the vapor-phase section with $AlCl_3$ particles. Ordinarily the distribution of $AlCl_3$ in the reaction mix is adequate enough to insure a satisfactory contact, but, if desired, mechanical stirring means may be provided. When propane is the solvent in the liquid-phase section of the reactor, it is believed that so much of the butane catalyst solvent as is vaporized upon release of pressure in throttle valve 25 will be immediately recondensed by the self-refrigerating action of the propane. Hence, propane, in effect, is utilized to cool the incoming catalyst solution, and the boiling action of the propane in the inlet zone will serve to diffuse the catalyst throughout the reaction mixture. If butane is the solvent for both the olefin and the catalyst, a boiling action in both solutions occurs in the removal of sensible heat from the hot butane solvent for the catalyst.

As will be apparent from the drawing and the foregoing description, hydrocarbon vapors formed by the self-refrigerating action in the liquid-phase section of the reactor, those formed by the adiabatic vaporization of the olefin feed above the liquid level of the reaction mixture and the vapors rising through line 42 from settler 41 are combined in the vapor-phase section of the reactor. These combined vapors pass upwardly through a series of entrainment separators here shown in the form of baffles 11a to outlet conduit 27 through pressure control discharge valve 28. This pressure control valve serves to maintain the vapor pressure in the reactor at the desired point and thereby to fix the polymerization reaction temperature. Hydrocarbon vapors from discharge valve 28 next pass through heat exchanger 29 where the vapors are superheated in order to prepare them for compression in pump 30 without condensation in the pump. The compressed vapors flow by way of pipe 31 through water-cooled condenser 32, and the condensate formed is collected in condensate drum 33. A bleeding valve 34 is provided for the removal of any fixed gases, e. g., methane or ethane. The condensed hydrocarbons now in liquid phase are collected and conveyed by line 35 to heat exchanger 29 where heat exchange with the outlet vapors from reactor 11 effects the desired superheating action while simultaneously cooling the condensed liquid hydrocarbons. The thus precooled hydrocarbon condensate is returned by conduit 36 and throttle valve 37 to reactor 11.

The recycled liquid-phase hydrocarbons in line 36 ahead of throttle valve 37 preferably are at a temperature of at least about 30° F. but not more than 180° F. above the equilibrium temperature of the reaction mixture in the liquid-phase section of reactor 11. Pressure on this liquid-phase condensate will be correspondingly higher than the equilibrium pressure in the reactor, and upon passing through throttle valve 37 this pressure is released, whereupon the recycled hydrocarbon condensate is immediately introduced into reactor 11 and brought to equilibrium conditions by adiabatic vaporization of a portion of said condensate prior to dispersion in the liquid-phase reaction mixture. This adiabatic vaporization preferably is effected on perforated plate 10 where simultaneous mixing with the olefin feed also occurs. The vapors from the recycled hydrocarbon condensate are in turn combined with those from the olefin feed, those rising through line 42 from settler 41 and those from the self-refrigerating action of the reaction mixture. This combination of vapors from all four sources affords automatic adjustment to equilibrium conditions of the pressure and temperature of all feeds and simplifies the removal of heat from the reaction zone, by reason of the fact that a single composite vapor may then be compressed and condensed by heat removal at a temperature substantially above that in the reaction zone.

It has been found that the quality, in particular the viscosity, of the resulting polymeric products and the extent of conversion of mono-olefins to viscous polymers are functions of certain variables of the process and specifically of the reaction temperature and the concentration of aluminum chloride in the reaction mix. A certain threshold value of this concentration of aluminum chloride in the reaction mix equal to about 0.1 weight per cent is found to exist, below which practically no conversion can take place. Of course, the optimum value of aluminum chloride concentration depends on the particular mono-olefin feed used for the polymerization. Generally speaking, for all types of olefin feeds embraced by this invention the conversion increases upon increasing the concentration of aluminum chloride in the reaction mix.

Product viscosity of propylene polymers is essentially a function of reaction temperature, higher viscosity polymers being obtainable at lower temperature; however, viscosity is independent of the concentration of aluminum chloride in the reaction mix above the threshold value.

In the case of butylene polymers obtainable by polymerizing a mixed feed of normal and isobutylenes, viscosity of the polymeric product appears to be the function of both the reaction temperature and the aluminum chloride concentration. Less viscous butylene polymers are obtainable for a higher concentration of the catalyst at a given reaction temperature and more viscous butylene polymers are obtainable for a lower concentration of the catalyst. Likewise, for a constant aluminum chloride concentration in the reaction mix, lower viscosity butylene polymers are obtainable with increasing reaction temperatures.

Consequently, in using the process of the present invention it is possible to select such preferred set of operating conditions, by properly controlling the reaction temperature and the concentration of the catalyst in the reaction mix, as would furnish crude polymers of a desired viscosity.

Another remarkable and advantageous feature of the process consists in the production thereby of a substantially uniform polymer by reason of the constant reaction temperature which is secured by the uniform distribution of the catalyst in the reaction mix and by the application of self-refrigeration, as compared with those processes which resort to external cooling or use fixed-bed catalysts. Thus, crude polymers obtainable by the present process contain a high proportion of the stock of a selective viscosity which, in turn, may be determined by reaction temperature and proportions of the catalyst.

Very satisfactory conversion of mono-olefins into viscous polymeric products of an unusually uniform quality may be obtained by the process. Conversion values as high as 100% have been attained.

It should be noted that polymerization of propylene in the presence of solid $AlCl_3$ catalyst heretofore has yielded poor results. It seemed impossible to obtain satisfactory high yields of the polymer without adversely affecting its quality, i. e., viscosity. Catalysis by means of $AlCl_3$ dissolved in liquid butane, which is one of the particularly distinctive features of the process of this invention, has now been found to result in unexpectedly high yields of polypropylene of high viscosity.

The following typical examples are given to illustrate the application of the process of the present invention described in general terms in the preceding paragraphs.

*Example 1.*—Propylene-propane feed stock containing about 12 volume per cent of propylene dissolved in propane is used. The solution is maintained liquid at a temperature of about 100° F. and under a pressure of about 250 pounds per square inch gauge. This feed is precooled and dried, in accordance with the previously given general description of the process. The temperature and the pressure of the feed stock just prior to its admission into the reactor are about 70° F. and about 240 pounds per square inch gauge, respectively. Upon admission of the feed solution into the reactor, operated at a temperature of about −10° F. and a pressure of about 25 pounds per square inch gauge, above the perforated plate in the vapor-phase section of the reactor, the feed mixture undergoes adiabatic vaporization and is cooled to the equilibrium conditions.

The vapors formed by virtue of the withdrawal of the heat of polymerization from the liquid-phase section of the reactor, and the vapors resulting from the removal of the sensible heat from the incoming feed stream in the vapor-phase section, pass upwardly through the previously mentioned entrainment separators, the pressure control valve and the heat exchanger, where they are superheated 25° F. by heat exchange with recycled liquid condensate returning to the reactor.

On leaving the heat exchanger, the superheated vapors are compressed and condensed at about 100° F. and any of the fixed gases present therein are eliminated by venting. The condensate is recycled to the reactor after passing through the previously mentioned exchanger where it is subcooled 15° F.

The $AlCl_3$ used for the polymerization of propylene is commercial-grade, solid aluminum chloride. It is charged into the saturators maintained at about 185° F. Liquid butane solvent substantially free from olefins and $C_5$ and higher paraffin hydrocarbons is freed from water in a manner similar to that indicated above for the feed stock. It is then heated and introduced into the saturators at a temperature of at least about 185° F. and under a pressure of about 210 pounds per square inch gauge, either in upflow or in downflow, as may be preferred under the particular operating conditions. Aluminum chloride dissolves in hot butane, and the liquid catalyst solution is now conveyed to the reactor. The admission of the catalyst into the reactor is conveniently regulated so as to insure the preferred catalyst concentration of about 0.2 weight per cent in the reaction mix. The time of contact between the catalyst and the feed varies from 20 to 120 minutes, depending upon the particular operating conditions. Polymer solution is continuously withdrawn from the reactor and sent into the reaction mix settler. It is pumped from the settler and conveyed under a pressure of about 240 pounds per square inch gauge and at a temperature of about −10° F. to the precooler, where its temperature is raised by heat exchange to about 50° F. and that of the incoming feed is correspondingly lowered. From this precooler, the solution is conveyed to a set of filters packed with adsorbent clay, where the residual catalyst is removed as shown under the general description of the process, whereupon the polymer solution proceeds to the polymer recovery.

The viscosity of the final product is 1,500 S. S. U. at 210° F. A 90% olefin conversion is obtained at a temperature of −10° F. in the reactor and an optimum concentration of aluminum chloride in the reaction mix equal to about 0.2 weight per cent. It must be understood, however, that the above viscosity value is illustrative only of this particular example, and that by varying the temperature of polymerization polypropylene polymers with viscosities ranging from 100 S. S. U. to 3,500 S. S. U. at 210° F. may be produced.

*Example 2.*—In this example, butylene-butane feed stock, containing about 35 volume per cent of butylenes dissolved in liquid butane, is used. These butylenes contain 20% by volume of alpha-butylene and 45% by volume of beta-butylene and 35% by volume of isobutylene. The initial feed solution is introduced into the system at a temperature of about 100° F. and under a pressure of about 150 pounds per square inch gauge. After being precooled and treated in accordance with the general description of the process, the feed is conveyed into the reactor at a temperature of about 70° F. and under a pressure of about 140 pounds per square inch gauge. The reactor is operated at about 30° F. under a pressure of about 5 pounds per square inch gauge. On releasing the pressure in the throttle admission valve, the feed passes upon the perforated plate in the vapor-phase section of the reactor, undergoes adiabatic vaporization and is cooled to the equilibrium conditions, the vapors rising to the top of the reactor through the entrainment separators. The vapors pass to the superheater by way of the control valve and are superheated 25° F. by the liquid hydrocarbon condensate returning to the reactor. Ascending vapors are compressed and condensed at 100° F., and any of the fixed gases which might be present are eliminated by venting in a manner analogous to that described in Example 1. Finally, the condensate is recycled to the reactor after first being subcooled 15° F. in the heat exchanger.

The dissolution of aluminum chloride catalyst in hot liquid butane, the admission of the catalyst solution into the reactor and the recovery of the final product are effected in the same manner as given under the general description of the process and under the Example 1. The concentration of aluminum chloride in the reaction mix and the reaction temperature determine the extent of conversion and the viscosity characteristics of the final product. The optimum concentration of the aluminum chloride catalyst lies between 0.14 and 0.18 weight per cent, and a 40% conversion is obtained with the viscosity of the final product being about 1,500 S. S. U. at 210° F.

Polybutylene products, with viscosities ranging from 50 to 30,000 S. S. U. at 210° F., up to and including plastic solids, may be obtained by correspondingly varying the temperature of polymerization and the concentration of the catalyst in the reaction mixture.

It must be understood that other appropriate solvents, which may contribute a part or most of the refrigerating effect for the operation of the process, may be used with the olefin feed, provided such solvents boil below the temperature of the reaction mixture at the equilibrium pressure. While inert hydrocarbon solvents of the paraffinic series are preferred, the use of such solvents containing more than eight carbon atoms is undesirable owing to difficulties in separating said solvents from the polymeric product by distillation.

The high conversion values and uniform quality of the polymeric product coupled with the simplified equipment and techniques of the process, as well as the reduction in the loss of any of the hydrocarbon materials used in carrying out the new process, its smooth and continuous operation, and other previously mentioned advantages, characterize the process of the present invention as a significant advance in the art of olefin polymerization.

The specific operating conditions, temperatures and pressures disclosed in the examples of this specification and the constructional details of the process set forth therein are merely illustrative of the invention and do not in any manner restrict its scope and application. Various changes and modifications of either the process itself or of the materials used therefor are possible, and all such changes and modifications, whenever they come within the scope of the annexed claims, are embraced thereby.

We claim:

1. In a process of producing high molecular weight olefin polymers at a reaction temperature between about 150° F. to about −30° F., the steps of providing as a catalyst a solution of a Friedel-Crafts type, normally solid metal halide catalyst in hot liquid butane containing less than 0.01 mol per cent of olefins and less than 0.1 mol per cent of $C_5$ and higher paraffin hydrocarbons, introducing said catalyst solution into a polymerization reaction mixture, maintained at a temperature and pressure substantially lower than that of the catalyst solution, below the liquid surface of said mixture, and causing intimate distribution of the normally solid catalyst throughout the reaction mixture.

2. In a process of producing high molecular weight propylene polymers at a reaction temperature between about 150° F. to about −30° F., the steps of providing as a catalyst a solution of a Friedel-Crafts type, normally solid metal halide catalyst in hot liquid butane containing less than 0.01 mol per cent of olefins and less than 0.1 mol per cent of $C_5$ and higher paraffin hydrocarbons, introducing said catalyst solution into a propylene polymerization reaction mixture, maintained at a temperature and pressure substantially lower than that of the catalyst solution, below the liquid surface of said mixture, and causing intimate distribution of the normally solid catalyst throughout the reaction mixture.

3. In a process of producing high molecular weight butylene polymers at a reaction temperature between about 150° F. to about −30° F., the steps of providing as a catalyst a solution of a Friedel-Crafts type, normally solid metal halide catalyst in hot liquid butane containing less than 0.01 mol per cent of olefins and less than 0.1 mol per cent of $C_5$ and higher paraffin hydrocarbons, introducing said catalyst solution into a butylene polymerization reaction mixture, maintained at a temperature and pressure substantially lower than that of the catalyst solution, below the liquid surface of said mixture, and causing intimate distribution of the normally solid catalyst throughout the reaction mixture.

4. A process for continuous polymerization of propylene which comprises continuously polymerizing said propylene in a solution of liquid propane solvent in a closed zone having a vapor-phase catalyst-free section containing vapors of said solution and a liquid-phase reaction section containing said solution of propylene in said propane, the solution in said liquid-phase section having a boiling temperature of from 120° F. to −30° F. at the equilibrium pressure in the zone, catalyzing polymerization in said liquid-phase section and avoiding contamination of said vapor phase with the catalyst by continuously introducing beneath the surface of said liquid solution aluminum chloride dissolved in butane solvent at a temperature of at least 165° F., the butane solvent containing less than 0.01 mol per cent of olefins and less than 0.1 mol per cent of $C_5$ and higher paraffins, continuously feeding to the vapor-phase section additional liquid solution of propylene in propane, the temperature of said propylene feed being at least 30° F. above that of the liquid solution in said liquid-phase section, absorbing exothermic heat of polymerization from said last liquid solution by continuous vaporization of hydrocarbons therefrom, reducing foaming in said liquid-phase reaction section and removing sensible heat from the propylene feed by continuous adiabatic vaporization of hydrocarbons from said feed extraneously from said liquid-phase section, maintaining substantially the same equilibrium pressure of each of said vaporizations by combining the vapors therefrom and discharging the same at the equilibrium pressure of said zone.

5. A process for continuous polymerization of butylene which comprises continuously polymerizing said butylene in a solution of liquid butane solvent in a closed zone having a vapor-phase catalyst-free section containing vapors of said solution and a liquid-phase reaction section containing said solution of butylene in said butane, the solution in said liquid-phase section having a boiling temperature of from 120° F. to −30° F. at the equilibrium pressure in the zone, catalyzing polymerization in said liquid-phase section and avoiding contamination of said vapor phase with catalyst by continuously introducing beneath the surface of said liquid solution aluminum chloride dissolved in butane solvent at a temperature of at least 165° F., the butane solvent containing less than 0.01 mol per cent of olefins and less than 0.1 mol per cent of $C_5$ and higher paraffins, continuously feeding to the vapor-phase section additional liquid solution of butylene in butane, the temperature of said butylene feed being at least 30° F. above that of the liquid solution in said liquid-phase section, absorbing exothermic heat of polymerization from said last liquid solution by continuous vaporization of hydrocarbons therefrom, reducing foaming in said liquid-phase reaction section and removing sensible heat from the butylene feed by continuous adiabatic vaporization of hydrocarbons from said feed extraneously to said liquid-phase section, maintaining substantially the same equilibrium pressure on each of said vaporizations by combining the vapors therefrom and discharging the same at the equilibrium pressure of said zone.

6. A process for continuous polymerization of a normally gaseous polymerizable olefin of more than two carbon atoms which comprises continuously polymerizing a solution of said olefin in a liquid-phase normally gaseous aliphatic hydrocarbon solvent, in a closed zone having a vapor-phase catalyst-free section containing vapors of said solution and a liquid-phase reaction section containing said solution of polymerizable olefin in said solvent, the solution in said liquid-phase section having a boiling temperature of from 120° F. to −30° F. at the equilibrium presssure in the zone, and being maintained in intimate contact with aluminum chloride catalyst introduced into the liquid-phase reaction section beneath the surface of said liquid solution of olefin as a solution of aluminum chloride in substantially olefin-free liquid butane at a temperature of at least 165° F., continuously feeding into the vapor-phase section additional liquid solution of said polymerizable olefin in said hydrocarbon, reducing foaming and removing sensible heat from the incoming olefin feed solution by continuous adiabatic vaporization of hydrocarbons therefrom extraneously to the liquid-phase section, absorbing exothermic heat of the polymerization from the liquid solution in said liquid-phase section by vaporization of hydrocarbons therefrom, combining the vapors from these vaporizations in the vapor-phase section and discharging them at the equilibrium pressure of the zone.

7. A processs of producing high molecular weight propylene polymers by catalyzing the polymerization of liquid-phase propylene by means of a solution of aluminum chloride in substantially olefin-free liquid butane.

8. A processs of producing high molecular weight propylene polymers by catalyzing liquid-phase propylene by means of a solution of aluminum chloride in liquid butane containing less than 0.01 mol per cent of olefins and less than 0.1 mol per cent of $C_5$ and higher paraffins.

9. In a process which comprisses polymerizing a normally gaseous olefin in solution in a liquid-phase aliphatic hydrocarbon solvent in a liquid-phase reaction zone, the steps of feeding a liquid-phase solution of said olefin in said solvent to a preliminary evaporation zone substantially free of polymerization catalyst, said evaporation zone being in communication with hydrocarbon vapors from the reaction zone, said feed being at a temperature at least about 30° F. and a corresponding pressure above the equilibrium temperature and pressure in said reaction zone, removing heat of reaction in the reaction zone by vaporization of hydrocarbons from the reaction mixture into said evaporation zone, automatically establishing equilibrium conditions of the evaporation zone and the reaction zone in the feed by partial vaporization thereof in said evaporation zone in contact with the vapors from the reaction zone, and passing the remaining liquid feed to said reaction zone.

10. A process according to claim 9 in which the normally gaseous olefin is propylene and the solvent contains at least a major portion of propane.

11. A process according to claim 9 in which the normally gaseous olefin is butylene and the solvent contains at least a major portion of butane.

12. In a process of continuously polymerizing normally gaseous olefins of more than two carbon atoms in a liquid-phase, normally gaseous, aliphatic hydrocarbon solvent, said solution having a boiling point no higher than the reaction temperature at the selected equilibrium presssure for the polymerization system, said system containing a liquid-phase reaction zone and a preliminary evaporation zone in communication with the vapors from the reaction zone, the steps of removing exothermic heat of polymerization from the reaction zone by vaporization of hydrocarbons therefrom into said evaporation zone, removing at least about 30° F. of sensible heat from said liquid-phase olefin solution upon introduction into said evaporation zone by partial vaporization thereof in contact with the vapors from the liquid-phase reaction zone, removing the combined vapors from the evaporation zone, compressing and condensing the hydrocarbon vapors to liquid-phase, continuously recirculating said condensed liquid-phase hydrocarbons into the evaporation zone to cause partial vaporization thereof, passing the chilled liquid-phase olefin solution and condensed hydrocarbons at equilibrium presssure from the evaporation to the reaction zone, and substantially precluding polymerization in the preliminary evaporation zone by introducing a normally solid Friedel-Crafts type catalyst below the liquid surface in the liquid-phase reaction zone.

13. A processs according to claim 12 in which the normally gaseous olefin is propylene and the solvent contains at least a major portion of propane.

14. A process according to claim 12 in which the normally gaseous olefin is butylene and the solvent contains at least a major portion of butane.

IRVING E. LEVINE.
LEON T. FOLSOM.

REFERENCES CITED

The following references are of record in the file of this patent:

UNITED STATES PATENTS

| Number | Name | Date |
| --- | --- | --- |
| 1,999,345 | Stevens et al. | Apr. 30, 1935 |
| 2,085,524 | de Simo | June 29, 1937 |
| 2,165,373 | Hofmann et al. | July 11, 1939 |
| 2,196,363 | Robertson | Apr. 9, 1940 |
| 2,317,878 | Bannon | Apr. 27, 1943 |
| 2,360,632 | Mann et al. | Oct. 17, 1944 |